(12) United States Patent
Oetiker

(10) Patent No.: US 6,464,233 B1
(45) Date of Patent: Oct. 15, 2002

(54) BELLOWS-TYPE COVER MEMBER

(75) Inventor: Hans Oetiker, Horgen (CH)

(73) Assignee: Hans Oetiker AG Maschinen- und Apparatefabrik, Horgen (CH)

( * ) Notice: Subject to any disclaimer, the term of this patent is extended or adjusted under 35 U.S.C. 154(b) by 0 days.

(21) Appl. No.: 09/806,534

(22) PCT Filed: Sep. 13, 1999

(86) PCT No.: PCT/CH99/00430

§ 371 (c)(1),
(2), (4) Date: Jun. 28, 2001

(87) PCT Pub. No.: WO00/20773

PCT Pub. Date: Apr. 13, 2000

(30) Foreign Application Priority Data

Oct. 2, 1998 (EP) .............................................. 98118715

(51) Int. Cl.⁷ .................................................. F16J 3/00
(52) U.S. Cl. ........................................ 277/636; 277/637
(58) Field of Search .................................. 277/634, 636, 277/637; 403/50, 51; 464/173, 175

(56) References Cited

U.S. PATENT DOCUMENTS 5,672,113 A * 9/1997 Tomogami et al.
6,209,885 B1 * 4/2001 Mukaida et al. ............ 277/634
6,328,498 B1 * 12/2001 Mersch ........................ 277/636

FOREIGN PATENT DOCUMENTS

| DE | 0 195 07 597 A | 9/1996 |
| EP | 0 425 864 A | 8/1995 |
| EP | 2 287 073 A | 9/1995 |
| EP | 0 669 476 A | 3/1997 |
| EP | 0 809 034 A | 11/1997 |

* cited by examiner

Primary Examiner—Robert J. Sandy
Assistant Examiner—Karlena D Schwing
(74) Attorney, Agent, or Firm—Pearne & Gordon LLP

(57) ABSTRACT

A bellows-type cover (10) into which a clamping member (40) is adapted to be securely integrated to form a pre-assembled unit; a groove shaped recess near one end of the bellows-type cover between first (20) and second (22) retaining means adapted to receive the clamping member has a two-tier positioning arrangement (11) with a radially inward, circumferentially extending bottom surface (27) for engagement by the clamping member when fully tightened and with a temporary bottom for the clamping member to provide a resealable self-retaining support for the closed, but not yet fully tightened clamping member at a radial distance between the bottom surface and the radially outer limit of the recess.

19 Claims, 3 Drawing Sheets

BELLOWS-TYPE COVER MEMBER

FIELD OF THE INVENTION

This application claims the benefit of International Application Number PCT/CH99/00430, which was published in English on Apr. 13, 2000.

The invention relates to a bellows-type cover made from elastic material, such as rubber or plastic material, used, for instance, for the protection of universal joints and drive shafts in which a clamping member or members such as hose clamps or shrinkable compression rings are integrated with the bellows-type cover.

BACKGROUND OF THE INVENTION

Flexible or elastic bellows-type covers usually of accordion-like construction, such as axle boots for universal joints or for drive shafts, must be carefully sealed to protect the lubricant. Such bellows-type covers have been used extensively in the automotive industry, for example to protect joints at a drive shaft. They are normally fastened to the axle stub shafts by means of hose clamps or shrinkable compression rings. A need exists at present on the part of manufacturers of universal joint shafts or drive shafts for bellows-type covers in which clamping members in the form of "Oetiker" hose clamps or "Oetiker" shrinkable compression rings are already integrated into the bellows-type covers. In other words, the manufacturers desire a product in which the clamping members are already integrated at or in the bellows-type covers which favours the automatic assembly of the universal joint or drive shafts in that the bellows-type covers provided with integrated clamping members are available as pre-assembled parts so as to avoid the need for mounting the clamping members on the bellows-type covers only at the final assembly as is often the case today.

SUMMARY OF THE INVENTION

Two possibilities exist, in principle, for a clamping member to be integrated into the bellows-type cover which consist of (1) the clamping member vulcanised into the bellows-type cover or (2) a self-holding arrangement for a clamping member adapted to be mounted on the bellows-type cover. Of these two possibilities, the first solution involving the clamping member vulcanised into the bellows-type cover can be disregarded because such an arrangement is practically not feasible with the usual hose clamps presently used as clamping members as also with compression rings used as clamping members. For example, a stepless hose clamp of the type disclosed in the U.S. Pat. No. 4,299,012, which has been used extensively with axle boots in the automotive industry, if vulcanised into the bellows-type cover, would present great difficulty of being tightened by deforming the "Oetiker" ear. The vulcanised-in solution is also unacceptable because of substantial increase in costs. A shrinkable compression ring, vulcanised into the bellows-type cover can no longer be shrunk by means of the presently available tools because these tools are designed to engage during the shrinking operation with the external surface of the compression ring having a predetermined diameter in a form-locking manner in order to reduce the compression ring in its diametric dimension by the application of radial forces. The layer of rubber or plastic material applied over the vulcanised-in shrinkable compression ring formed by the vulcanising operation prevents a form-locking connection between the compression ring and the compression tool. Equally inappropriate are arguments that vulcanising-in of the clamping members into the bellows-type covers provides a corrosion protection of the integrated hose clamps or compression rings because these problems can be readily avoided in the present invention by the use of approximate materials for the clamping devices, such as stainless steel or aluminum. Furthermore, a vulcanising-in of the clamping members precludes any visual control provided at the clamping member in the installed condition insofar as correct positioning and seating of the clamping member and proper tightening of the clamping member are concerned. Visual inspection of indications relating to manufacturer of the clamping members and/or installation dates would also become impossible. Up to the present, hose clamps used with drive or universal joint shafts have served extensively as information carriers in that dates such as assembly dates or other relevant dates of interest to the manufacturer were integrated into the clamping devices, for example, by stamping. Such visual inspections and controls are possible only as long as the clamping members are freely exposed which is not the case with a vulcanised-in solution.

Therefore, as a consequence the EP 0 809 034 proposes a bellows-type cover with integrated clamping member, which is adapted to be securely integrated to form a preassembled unit. A groove-shaped recess near one end of the bellows-type cover adapted to receive the clamping member has a two-tier positioning arrangement with a radially inward, circumferentially extending bottom surface for engagement by the clamping member when fully tightened and with a temporary bottom for the clamping member to provide a releasable self-retaining support for the closed, but not yet fully tightened clamping member at a radial distance between the bottom surface and the radially outer limit of the recess. Due to new production techniques for such kind of bellows-type cover members, such as blow injection or blow extrusion, it became very difficult or even impossible to produce the proposed bellows-type covers with integrated clamping members according to the EP 0 809 034.

SUMMARY OF THE INVENTION

Therefore, it is an object of the present invention to provide a bellows-type cover member with an integrated clamping member, similar to the one proposed in the EP 0 809 034 with the difference, that the bellows-type cover can easily be produced using new plastics processing techniques.

According to one embodiment of this invention, the pre-assembled unit consists of a bellows-type cover of rubber or plastic material and of an "Oetiker" shrinkable compression ring or hose clamp of metal, both readily mass-producible items, in which the clamping member, as customary to date, is installed between first and second retaining means protruding from the external diameter for receiving the clamping member at both ends of the bellows-type cover, i.e., in the small as also in the large outer diameter area of the bellows-type cover. To date, often groove-shaped recesses formed by fully around extending retaining means serve exclusively for the correct guidance of the clamping member in the fully installed condition but are unable to provide any self-retaining function for a pre-assembled clamping member such as a compression ring integrated into the bellows-type cover.

As mentioned above in that respect the EP 0 809 034 proposes circumferentially extending bottom surfaces, which are an integral part of the around extending retaining means. In principle this circumferentially extending bottom surface, which provides a releasable self-retaining support, makes it possible to arrange a clamping member to form a preassembled unit to overcome the disadvantages of the still often used bellows-type cover members as mentioned above. The disadvantage of the arrangement according to the EP 0 809 034 is that it is practically impossible to produce the bellows-type cover using modern plastics processing techniques, such as blow moulding or blow extrusion. The difference of the inventive embodiment is that a further means is proposed to provide a self-retaining support for the clamping member in a preassembled position at a distance of the bottom surface of the bellows-type cover member between the first and the second retaining means, which is not an integral part of the mentioned first and second retaining means, but which is arranged at a distance from the first retaining means as well as from the second retaining means.

According to a preferred embodiment of this invention, the bellows-type cover at the section of the retaining means for receiving the clamping member is of two-tier construction in that it is now provided with at least one, preferably with several, detent elements along the circumference thereof between the retaining means which position and hold the compression ring in a self-retaining manner, once placed between the retaining means prior to tightening or shrinking of the clamping member. The clamping member, such as a compression ring, can now be removed again from the bellows-type cover only with the use of large forces. As a result thereof, the clamping member such as a compression ring which is now automatically retained after being mounted on the bellows-type cover between the retaining means, now forms an integrated unit with the bellows-type cover for further processing the integrated unit of bellows-type cover and clamping member. The use of detent elements offers the advantage of providing a two-tier structure for accommodating the clamping member in which the radially outer position securely but only temporarily holds the clamping member as a part integrated into the bellows-type cover yet permits complete, reliable tightening of the clamping member by releasing the temporary radially outer position in the presence of predetermined tightening forces. The term "clamping member" is used in this application to describe both conventional clamps such as "Oetiker" stepless clamps as presently used with bellows-type covers as also shrinkable compression rings such as "Oetiker". puzzle lock compression rings as disclosed in U.S. Pat. Nos. 5,001,816 and 5,185,908, or any other kind of so-called press rings, clamping rings or shrinkable compression rings.

BRIEF DESCRIPTION TO THE DRAWINGS

These and other objects, features and advantages of this invention will become more apparent from the following description when taken in connection with the accompanying drawings which show, for purposes of illustration only, embodiments in accordance with the present invention, and wherein.

Figures 1, 2:
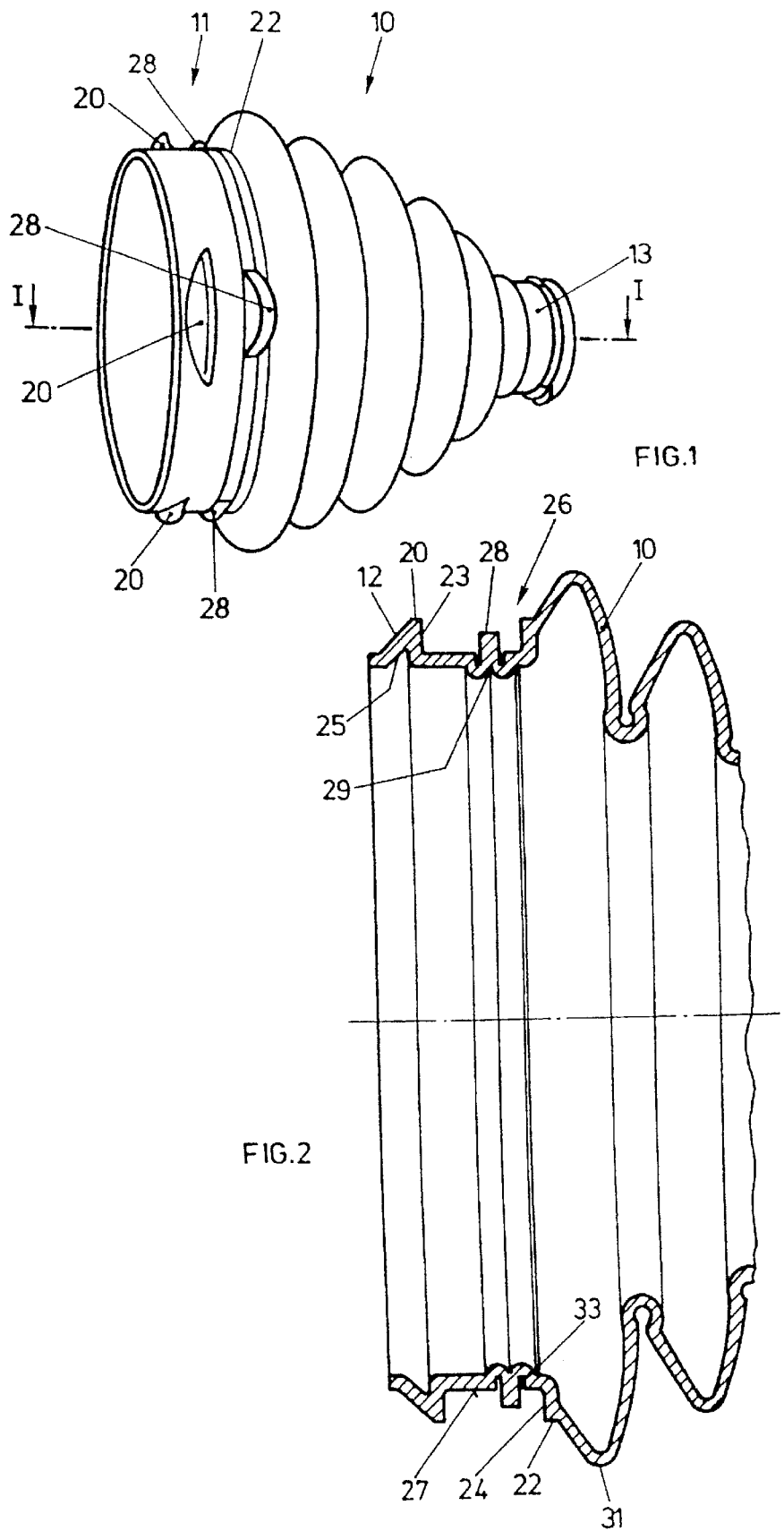
FIG. 1 is a schematic side-view of a bellows-type cover in accordance with the present invention.
FIG. 2 is a partial axial cross-sectional view through an end part of a bellows-type cover in accordance with FIG. 1 (along line I—I)
Figure 3:
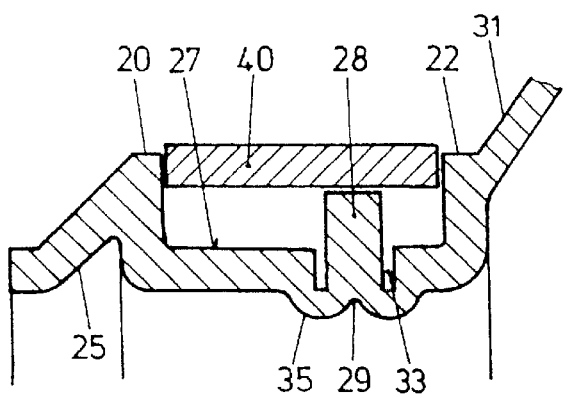
FIG. 3 is an enlarged partial axial cross-sectional view through one end of the bellows-type cover of FIG. 2, showing a clamping member in the form of a compression ring in the integrated, pre-assembled condition.
Figure 4:
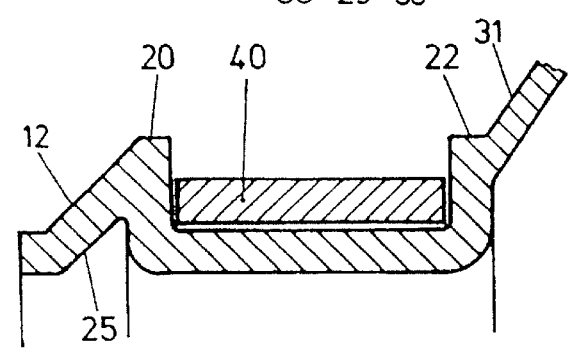
FIG. 4 is an enlarged partial axial cross-sectional view, similar to FIG. 3, showing the clamping member in the fully installed condition after the shrinking operation.
Figure 5:
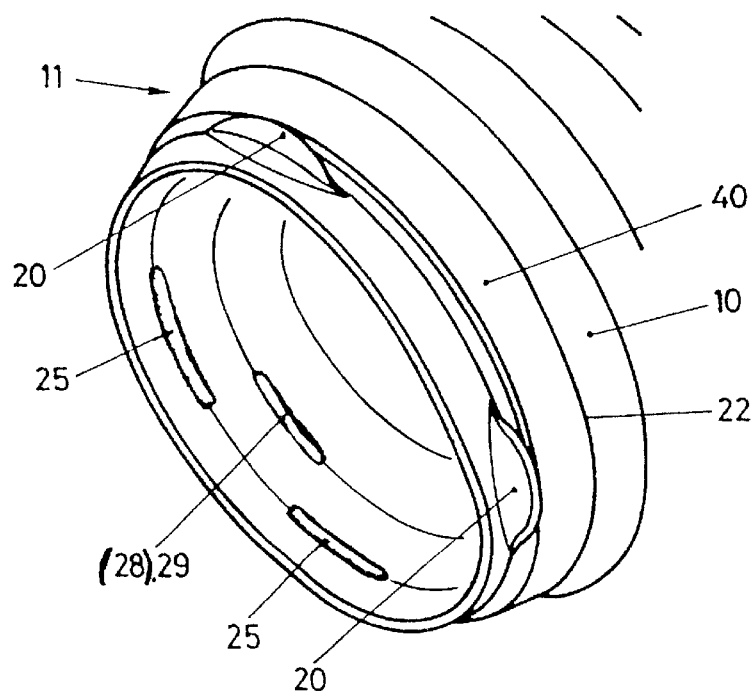
FIG. 5 is a perspective view of a bellows-type cover, similar to the one shown in FIG. 1, including a temporarily held clamping member before tightening.
Figure 6:
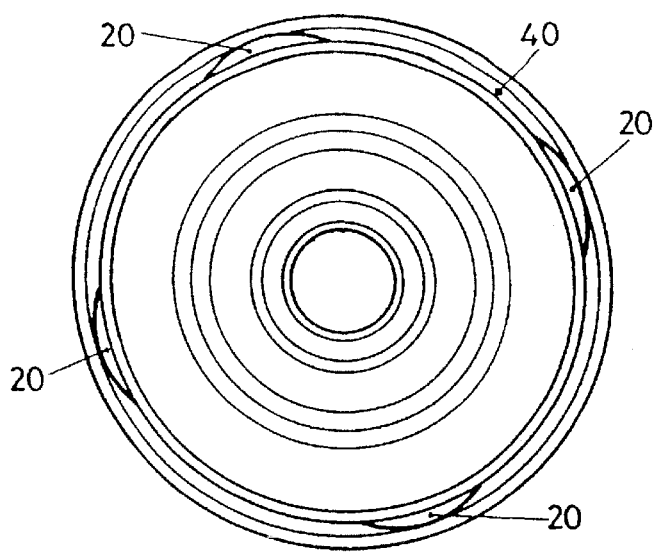
Figure 7:
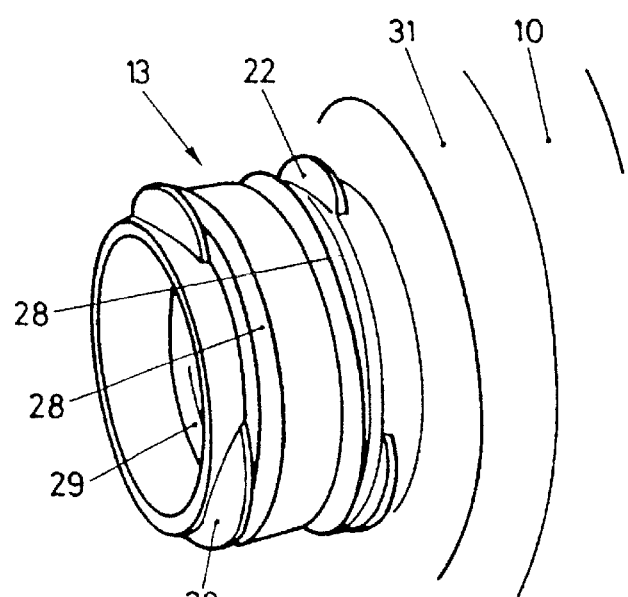
Figure 8:
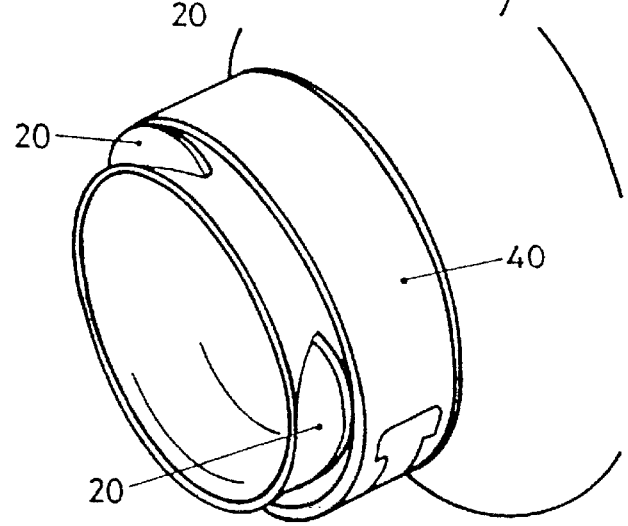

FIG. 6 the bellows-type cover with clamping member according to FIG. 5 in a view from the front side of the bellows-type cover;

FIG. 7 a perspective view of the end part of a bellows-type cover, similar to the one shown in FIG. 1, with a different design of the one end, and FIG. 8 the end of the bellows-type cover according to FIG. 7, holding a temporary clamping member before tightening or shrinking of the clamping member.

DETAILED DESCRIPTION OF THE DRAWINGS

Referring now to the drawing wherein like reference numerals are used throughout the various views to designate like parts, reference numeral 10 generally designates a bellows-type cover of elastic material such as rubber or plastic material which may be of any known construction. The two-tier arrangement provided, for example, at the large end of the bellows-type cover 10 is generally designated by reference numeral 11 which is provided with e.g. four circumferentially arranged first outer and second inner retaining projections, designated by reference numerals 20 and 22 which provide the positioning of the clamping member. The projections 20 and 22 are provided with side walls 23 and 24 and are spaced in the axial direction from one another at a distance slightly greater than the width of the clamping member generally designated by reference numeral 40. The radial depth of the projections is thereby slightly larger than the thickness of the clamping member 40. The radially outer retaining projections 20 of the structure are preferably formed by blown or bent out portions of the end portion 11 forming corresponding recesses 25. The radially inner retaining means 22 of the structure are formed by steps or projections within the outer side wall of the first bellows 31 of the bellows-type cover 10, which might be obtained by blow moulding or blow extrusion, using a correspondingly shaped tool. Within the upper surface 27 of the recess 26 extending between the two projections 20 and 22 further detent members or projections 28 which are circumferentially arranged are protuberated or bent out from the surface 27, forming corresponding recesses 29 on the backside of the basis 27. The detent-like members or projections 28 are integral with the basis of the larger end 11 of the bellows-type cover 10 and are therefore made of the same elastic material which permits yielding thereof. In addition, preferably on both sides of the detent-like members or projections 25 small or narrow grooves 33 are arranged, which are preferably extending circumferentially around the whole surface 27. In addition, on the backside of the basis 27 in the section of the detent-like member 1 or 2 projections 35 are arranged, which are extending circumferentially along the backside of the basis 27 and which are provided to engage in corresponding recesses arranged on the metal surface of the shaft, on which the bellows-type cover member is to be secured.

As shown in FIG. 1, the detent-like members, such as three, four or more, are distributed uniformly over the circumference of the basis 27 and retain the clamping member 40 such as an "Oetiker" puzzle-lock compression ring in the pre-assembled condition in which the clamping member 40 is securely held integrated with the bellows-type cover 10 because of the self-retaining function of the upper part of the side walls 23 and 24 of the projections 20 and 22 disposed radially outwardly of the detent-like members 28.

Upon application of tightening forces, the detent-like members 28 are able to yield to permit the clamping member 40 to enter the radially inward part of the groove-shaped recess 26 extending between the projections 20 and 22 in which they are then firmly held in position on the basis 27 of the groove-shaped recess 26 as a result of the tightening, respectively, shrinking of the diametric dimension thereof.

As mentioned above, the use of groove-shaped recesses in the external surfaces of the ends of bellows-type covers are known. However, up to now, they merely served the purpose of guiding the clamping member in the fully installed condition. The problem of providing a two-tier arrangement in which a self-holding feature is also attained in the radially outer position would not be attainable without the use of the detent-like members 28, because even a deeper recess between the retaining projections 20 and 22 would not safely provide the self-retaining action necessary to constitute the clamping member as a part integrated into the bellows-type cover because of the likelihood of the clamping member becoming detached again from the bellows-type cover when one side of the clamping member enters the groove-shaped recess between the retaining projections 20 and 22 to abut at the basis of the recess, in which case the opposite side would be able to slip out over the edge of the outer projection 22. Detent-like members in the form of elastic outward extending projections 28 which provide a temporary radially outer position of the two-tier arrangement with a completely safe retaining function to achieve the required integration are therefore necessary to assure an assembly of a bellows-type cover with integrated clamping member. The external surface 12 of the outer end of the outer retaining projections 20 is thereby inclined to form a rectilinearly obliquely upwardly extending flank to assist in centering and mounting the clamping ring in the recess between the retaining projections 20 and 22 of the self-retaining arrangement.

The bellows-type cover 10 is made of rubber, a thermoplastic or another elastomeric polymer material, such as polyester or polyamid elastomeric material, as e.g. of Hytrel, and is to be fastened over a metallic axle stub by means of a shrinkable compression ring such as an "Oetiker" puzzle-type compression ring as disclosed in the aforementioned U.S. patents.

FIG. 5 now shows again in perspective view the larger end portion of the bellows-type cover with the temporarily held clamping member 40 before shrinkage. In the perspective view of FIG. 5, two outer retaining means or projections 20 are visible as well as two of the inner retaining means or steps 22. Within the open end of the end portion on the other hand two recesses 25 are visible, which form the punched out retaining projections 20, which are on the non-visible surface of the large end portion 11 of the bellows-type cover 10. In addition, the detent members 28 are not visible in the arrangement according to FIG. 5, as they are covered by the temporarily arranged clamping member 40. On the other hand, again within the open end of the large end portion 11, a corresponding recess 29 is visible, which has been formed by punching out the detent-like projections 28, to hold the clamping member 40 in the pre-assembled condition.

In FIG. 6 the end portion 11 of FIG. 5 is seen from the front side to show-the four outer retaining projections 20, which at least partially cover the clamping ring 40 in the visible direction. The example shown in FIGS. 5 and 6 shows the arrangement of four outer retaining projections 20 as well as four inner retaining steps 22 as an example for the better understanding of this invention. Of course it is possible to arrange also three or five, six or more retaining means. It is even possible to arrange outer and inner retaining means, which are formed by a full ring projection. As according to the invention, preferably the retaining means are blown or bent out of the end portion of the bellows-type member, it is finally a question of manufacturing and of requirements, how many retaining projections are arranged. The same has to me mentioned in relation to the detent-like member 28, of which also only two, three or more projection members can be arranged as well as a fully outward extending ring, which again is protuberated, blown or bent out of the basis of the end portion, extending between the two retaining means.

In FIG. 7 a different design of an end portion of a bellows-type member is shown, as e.g. the small end of the bellows-type member, as shown e.g. in FIG. 1. Again, the outer and inner retaining projections 20 and 22 are visible, which again are preferably blown or bent out of the smaller end portion. Between the two retaining projections 20 and 22, two ring-like detent members 28 are arranged in the form of outward extending projections. Within the open end of the small end 13 of the bellows-type cover 10 at least partially the corresponding a ring forming recess 29 is shown to demonstrate that again the detent-like projections 28 are blow-moulded or blow-extruded out of the end portion 13.

FIG. 8 finally shows the end portion of FIG. 7 with the clamping ring 40 arranged before shrinkage.

While only a few embodiments have been shown and described in accordance with the present invention, it is understood that the same is not limited thereto but is susceptible of numerous changes and modifications as known to those skilled in the art. The two-tier arrangement may be used with any type of bellows made from any appropriate known elastic material whereby the detent members are designed to provide the required elasticity considering the material used for the bellows-type cover and the need for yieldingness to permit a release of the temporary radially outer position of the integrated clamping member. Furthermore, the detent members may be arranged between two retaining projections, but of course may be arranged at any place around the surface of the end portion of the bellows which is determined for the engagement of the clamp-like member. In other words, in axial direction of the bellows the inner retaining means, the detent-like member and the outer retaining means do not have to be within one line. The inner retaining means, the detent-like member as well as the outer retaining means may be arranged in staggered relationship, so that one first retaining means or detent member on one side is followed in a staggered manner in the circumferential direction by the next second retaining means or detent member on the other side, and so on. Additionally, the flank surface 12 needs not to be rectilinear, but may also have a curved configuration of any appropriate shape.

As a consequence therefore the present invention is not at all limited to the details shown and described herein, but is intended to cover all such changes and modifications as are encompassed by the scope of the appended claims.

What is claimed is:

1. A bellows-type cover member for an integratable clamping member to form a pre-assembled unit, comprising first and second retaining means (20, 22) in the bellows-type cover member (10) for receiving a clamping member (40), said first and second retaining means being at a distance which corresponds approximately with the width of the clamping member, so that the clamping member may be arranged in engagement between the said first and second retaining means in a fully installed position thereof, and temporary support means (28) between the first and second retaining means to provide a self-retaining support for the clamping member in a pre-assembled position at a distance of a bottom surface of the bellows-type cover member between the first and second retaining means, which support means are arranged separated from the first retaining means as well as separated from the second retaining means.

2. A bellows-type cover member according to claim 1, wherein said temporary support means is operable to release the clamping member in the presence of radially inwardly directed forces to enable the clamping member to move from said pre-assembled position to the fully installed position.

3. A bellows-type cover member according to claim 1 or 2, wherein said temporary support means is yieldable.

4. A bellows-type cover member according to claim 1 or 2, wherein temporary support means includes at least one detent member extending at least partially around the bottom section of the bellows-type cover member extending between the first and second retaining means and which is protuberated, blown or bent out of the bottom section extending radially outwardly to form a temporary retaining support bottom.

5. A bellows-type cover member according to claim 4, wherein at least on one side of the one detent member within the bottom section an at least partially along the circumference of the bottom section extending groove or recess (33) is provided.

6. A bellows-type cover member according to claim 1 or 2, wherein on a backside surface of the bottom surface of the bellows-type cover member extending between the first and second retaining means at least one in circumferential direction extending projection is arranged, provided for the engagement into a corresponding groove or recess on a surface, on which the bellows-type cover member is to be secured.

7. A bellows-type cover member according to claim 4, wherein said temporary support means is extending along the full circumference of the bottom section, extending between said first and second retaining means.

8. A bellows-type cover member according to claim 1 or 2, wherein said temporary support means include at least two or more detent members extending between said first and second retaining means and which are provided at a distance along the circumference of said bottom section.

9. Bellows-type cover member according to claim 8, wherein at least two detent members are provided along the circumference of said bottom section and at least two detent members in an offset direction along the longitudinal axis of the bellows-type cover member.

10. Bellows-type cover member according to claim 1 or 2, wherein at least said first retaining means are obtained by blow-moulding or blow-extrusion out of the bellows-type cover member forming corresponding recesses on the backside surface opposite to the surface forming the retaining means.

11. Bellows-type cover member according to claim 10, wherein two or more first and second retaining means are provided along the circumference of said bellows-type cover member.

12. Bellows-type cover member according to claim 1 or 2, wherein at least three of each first and second retaining means are arranged for receiving a clamping member between the first and second retaining means.

13. Bellows-type cover member according to claim 1 or 2, wherein said bellows-type cover member includes a clamping member arranged between the first and second retaining means as an integrated part thereof.

14. Bellows-type cover member according to claim 13, wherein said clamping member is supported in a pre-assembled position by the further means which provide a self-retaining support position to carry the clamping member.

15. An assembly of a bellows-type cover means with a pre-assembled integrated clamping member adapted to be received between first and second retaining means provided in the bellows-type cover means, characterised in that the section of the bellows-type cover means extending between the first and second retaining means includes further means providing a two-tier positioning of the clamping member in which in a first position the clamping member is integrated with the bellows-type cover means corresponding to a not-yet-tightened condition of the clamping member and in width, in a second position, the clamping member is in a installed tightened position.

16. An assembly according to claim 15, wherein said temporary support means is operable to provide a self-retaining action on the clamping member in said first position at a substantially constant radial distance with respect to the bellows-type cover means.

17. An assembly according to claim 15 or 16, wherein said temporary support means is formed by axially extending projection means for non-removably retaining the clamping member in said recess means, and wherein said projection means are yieldable in the presence of tightening forces seeking to displace the clamping member from the first to the second position.

18. An assembly according to claim 17, wherein said projection means are punched-out sections within the bellows-type cover means section extending between the first and second retaining means.

19. An assembly according to claim 15 or 16, wherein at least the first retaining means are formed by blow-moulded or blow-extruded sections within the bellows-type cover means.

* * * * *

UNITED STATES PATENT AND TRADEMARK OFFICE
CERTIFICATE OF CORRECTION

PATENT NO. : 6,464,233 B1
DATED : October 15, 2002
INVENTOR(S) : Hans Oetiker

It is certified that error appears in the above-identified patent and that said Letters Patent is hereby corrected as shown below:

Title page,
Item [56], References Cited, OTHER PUBLICATIONS, please insert -- Patent Abstract of Japan, Dec. 13, 1994 for Publ. No. 06341551, 1 page. --.

Signed and Sealed this

Twenty-fifth Day of February, 2003

JAMES E. ROGAN
*Director of the United States Patent and Trademark Office*